(12) United States Patent
Valecha et al.

(10) Patent No.: US 12,244,649 B2
(45) Date of Patent: Mar. 4, 2025

(54) INTERNET-OF-THINGS DEVICE SECURITY OPTIMIZATION

(71) Applicant: INTERNATIONAL BUSINESS MACHINES CORPORATION, Armonk, NY (US)

(72) Inventors: Vinod A. Valecha, Pune (IN); Vaibhav Vijay Gadge, Pune (IN); Vaibhav Telang, Pune (IN); Rahul Nema, District Durg (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 17/816,441

(22) Filed: Aug. 1, 2022

(65) Prior Publication Data
US 2024/0039962 A1 Feb. 1, 2024

(51) Int. Cl.
*H04L 9/40* (2022.01)
*G16Y 30/10* (2020.01)

(52) U.S. Cl.
CPC ............ *H04L 63/205* (2013.01); *G16Y 30/10* (2020.01); *H04L 63/0428* (2013.01)

(58) Field of Classification Search
None
See application file for complete search history.

(56) References Cited

U.S. PATENT DOCUMENTS

| | | | |
|---|---|---|---|
| 2018/0019988 A1* | 1/2018 | Li | H04L 63/205 |
| 2019/0158353 A1* | 5/2019 | Johnson | G06F 16/95 |
| 2019/0213332 A1 | 7/2019 | McCoy | |
| 2020/0092254 A1* | 3/2020 | Goeringer | H04L 45/46 |
| 2021/0258151 A1* | 8/2021 | Cristina | G06F 21/602 |
| 2021/0342468 A1 | 11/2021 | Nagar | |
| 2021/0385683 A1 | 12/2021 | Boyapalle | |
| 2022/0014466 A1 | 1/2022 | Doshi | |
| 2023/0019026 A1* | 1/2023 | Agarwal | H04L 63/20 |
| 2023/0370452 A1* | 11/2023 | Mannengal | H04L 63/20 |

FOREIGN PATENT DOCUMENTS

| | | |
|---|---|---|
| CN | 112270015 A | 1/2021 |
| CN | 113572762 A | 10/2021 |
| CN | 114282591 A | 4/2022 |

OTHER PUBLICATIONS

"Patent Cooperation Treaty PCT Notification of Transmittal of the International Search Report and the Written Opinion of the International Searching Authority, or the Declaration", Applicant's file reference PF230428PCT, International application No. PCT/CN2023/110147, Date of mailing Oct. 20, 2023, 8 pages.

(Continued)

*Primary Examiner* — Anh Nguyen
(74) *Attorney, Agent, or Firm* — Elliot J. Shine

(57) ABSTRACT

A processor may identify that content is generated for a communication between IoT devices. The processor may identify a source device and a target device of the IoT devices. The processor may analyze the content. The processor may determine a sensitivity of the content. The processor may assign, based on the determining, a security level to either of the source device or the target device.

19 Claims, 5 Drawing Sheets

(56) References Cited

OTHER PUBLICATIONS

Disclosed Anonymously, "A Method to Implement Irreversible Security Exchanging for Web Services", An IP.com Prior Art Database Technical Disclosure, IP.com No. IPCOM000237669D, Jul. 2, 2014, 9 pgs.

Disclosed Anonymously, "An Intelligent Adaptive Security Method on Cloud Database Architecture", An IP.com Prior Art Database Technical Disclosure, IP.com No. IPCOM000259595D, Aug. 27, 2019, 6 pgs.

Disclosed Anonymously, "Method and System for Contextual and Automated Configuration of Devices to Restrict Misuse of Sensitive Data", An IP.com Prior Art Database Technical Disclosure, IP.com No. PCOM000258843D, Jun. 19, 2019, 6 pgs.

Disclosed Anonymously, "Method for Providing Enhanced Security for Mobile Device Application Groupings and Folders", An IP.com Prior Art Database Technical Disclosure, IP.com No. PCOM000248609D, Dec. 21, 2016, 5 pgs.

Mell, et al., "The NIST Definition of Cloud Computing", National Institute of Standards and Technology, Special Publication 800-145, Sep. 2011, 7 pages.

Olivereau, et al., "An Adaptive Method for Providing Content Integrity Protection", An IP.com Prior Art Database Technical Disclosure, IP.com No. IPCOM000133801D, Feb. 9, 2006, Copyright: © Motorola, Inc., 12 pgs.

\* cited by examiner

INTERNET-OF-THINGS DEVICE SECURITY OPTIMIZATION

BACKGROUND

The present disclosure relates generally to the field of internet-of-things (IoT) security, and more specifically to automatic IoT device security optimization.

As cloud infrastructure has emerged as a universal platform to run systems at central locations, end devices have grown exponentially across the world. There are now more IoT devices than there are people in the world, and this is possible because all devices are, in some way, connected together through the IoT network. Understandably, with so much data flowing across the IoT network, security becomes paramount. The general method to solve such security issues is to use encryption and decryption of stored and flowing data. However, the use of encryption and decryption algorithms on IoT devices to secure the data can overload the IoT devices.

SUMMARY

Embodiments of the present disclosure include a method, computer program product, and system for optimum IoT device security. A processor may identify that content is generated for a communication between IoT devices. The processor may identify a source device and a target device of the IoT devices. The processor may analyze the content. The processor may determine a sensitivity of the content. The processor may assign, based on the determining, a security level to either of the source device or the target device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
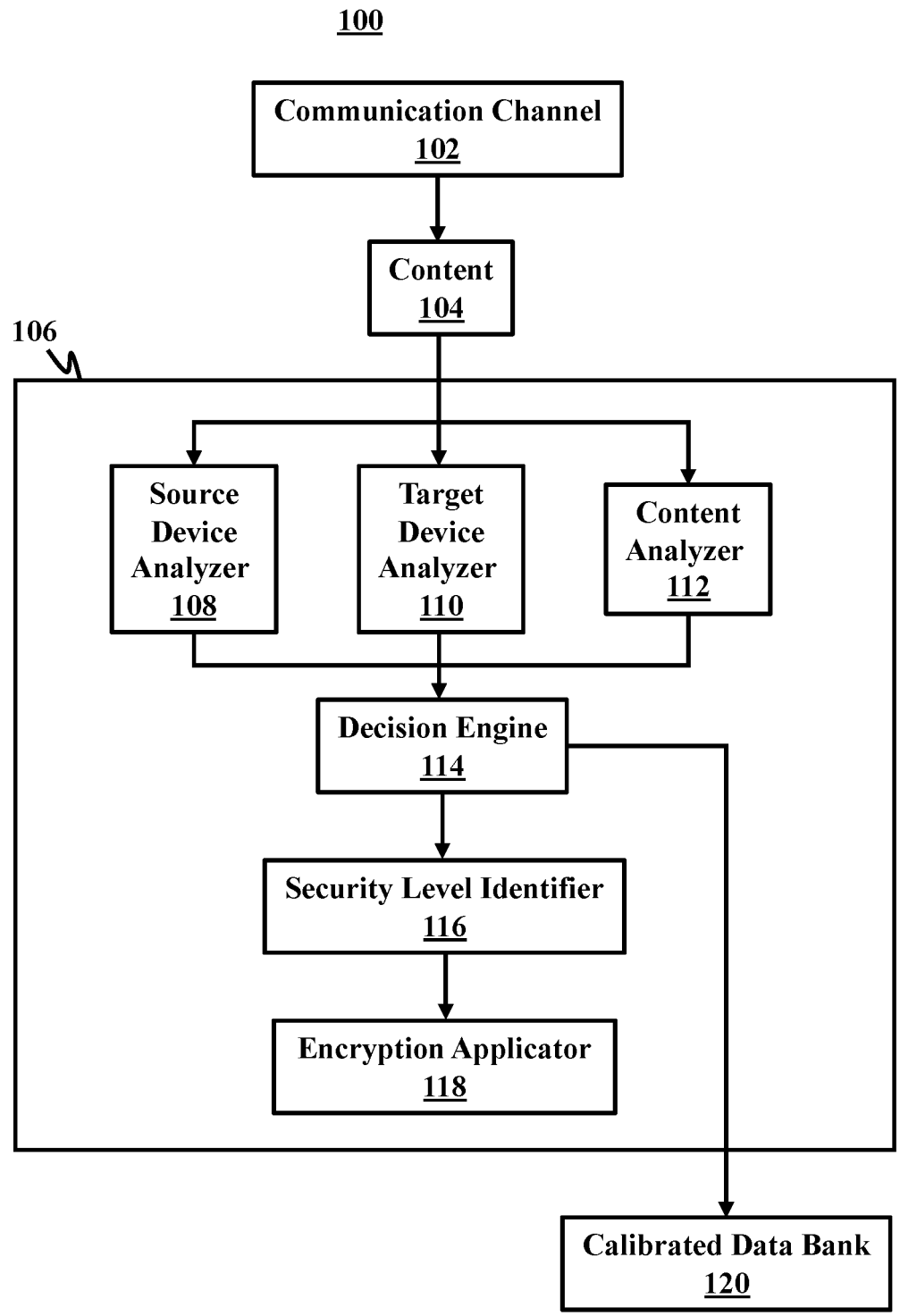
FIG. 1 illustrates a block diagram of an example system for optimum IoT device security, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of internet-of-things (IoT) security, and more specifically to automatic IoT device security optimization. While the present disclosure is not necessarily limited to such applications, various aspects of the disclosure may be appreciated through a discussion of various examples using this context.

As cloud infrastructure has emerged as a universal platform to run systems at central locations, end devices have grown exponentially across the world. There are now more IoT devices than there are people in the world, and this is possible because all devices are, in some way, connected together through the IoT network. Understandably, with so much data flowing across the IoT network, security becomes paramount. The general method to solve such security issues is to use encryption and decryption of stored and flowing data. However, the use of encryption and decryption algorithms on IoT devices to secure the data can overload the IoT devices. For instance, an assortment of security methods has currently been applied to acquire the confidence of users to store remotely (networked) data, which eventually causes overload of security/encryption processing for every bit of data on a computation system (e.g., a source device and/or target device.

Moving forward, as devices become smaller, computation capacity and power consumption becomes critical. For example, every smart phone consumes a lot of power in just encryption and decryption for every bit of data. These smart phones are generally much smaller devices than those devices which send data on a network. As to be discussed throughout this disclosure, there is accordingly a lot of data that truly does not need so much security processing or overheads.

As there is not dynamism in accessing a security level of any content, common or generic universal security application rules become overhead of any processing if there is a need for a system to be secured. For example, if a smart phone is accessing a publicly available webpage, such as for news, or weather, even if the smart phone needs to be secured, it does not need to encrypt or decrypt every bit associated with the news webpage or weather-page site while loading.

Following the example, it is noted that smart phones, and IoT devices in general have the inherit limitations of: less computing/CPU available, and less wattage/power available. This in-turn leads more power and CPU utilization during encryption/decryption, which further reduces the IoT devices overall capacity of/for computing.

Accordingly, if considered in a cluster of IoT devices at work, or even at home, there may be a lot of complex mesh communication among devices and a lot of data transfer. Thus, it becomes extremely important to determine which all IoT device communications need to be secure communications.

Thus, disclosed herein is a solution that reduces overload of security processing based on actual content to be processed by an IoT device. If content is critical, then security level needs to be maintained, but if it is not required, the system shall reduce the security level while dynamically processing the content/data. That is, instead of a blanket high security level across a system for every bit of data for transfer or storage, disclosed herein is a solution for a system (or system) that can adjust security level based on content to be processed on network or off network.

This solution includes, but is not limited to: dynamically detecting the content's security level for IoT devices, where content that is data that needs to be sent/received, and where content is moving through a communication channel; applying the security level based on content sensitivity (e.g., sensitivity of the content) detection (e.g., medical information is a higher sensitivity and thus higher security level than a generic text message, etc.); automatically detecting security level of data, where security is based on organized/identified parameters (e.g., calibrated data/data bank). In some embodiments, when a parameter has an expected value, device algorithm, etc. the solution assumes sensitive data is flowing. Further, whenever the solution detects sensitive data flow, it will trigger flow to enhance security.

Put simply, the solution to be discussed herein is a method, system, and/or computer-program product that provides dynamic security levels to IoT devices based on the sensitive nature of the data produced, captured, or transmitted at, or from, the IoT devices. In some embodiments, the dynamic security levels to the IoT device may be based on: geographical location (e.g., a public café, a processing plant, etc.), the source of the data/content (e.g., IoT devices that are tagged as sensitive by the manufacturer of the device, etc.), the target of the data (e.g., IoT device to which data is sent has been marked as sensitive by the device manufacturer, etc.), and/or type of IoT device (e.g., a CCTV would be considered more sensitive in nature as compared to a temperature measuring device, etc.).

Now, as an in-depth example of the solution disclosed herein, assume:

Device 1 (D1)→is an IoT device in a network,
Device 2 (D2)→is another IoT device in a network,
Device N (Dn)→represents the nth IoT device in the network,
Communication Link (Li)→represents the communication between two IoT devices, and
Dn−1←Li→Dn=Represents the link between the nth IoT device and (n−1)th IoT device.

Thus, the solution may: analyze the data generated at device Dn and determine the level of PII/SPI (personal identifiable information/sensitive personal information) data generated. (w1), Determine/identify the ability of one IoT device to control or function other IoT devices. (w2),
Determine/identify the ability of an IoT device to impact the overall system. (w3) (e.g., temperate control IoT devices in a power plant or gas control device in a chemical factory, etc., and
Based on the determination/identification calculate the security level (SL) for the device Dn. The security level may be a value between 1 to 5 with 1 being the lowest and 5 being the most sensitive data generation. Security level may be defined as S=f(w1, w2,w3).

In some embodiments, the solution may further: calculate the SL for each device in the network, rank the IoT devices based on the calculated SL, and calculate the SLs for the communication link (Li) between all devices.

In some embodiments, security level calculation for the communication link(s) may include the solution receiving/retrieving the security levels of both, or all, devices involved in the communication (e.g., SLn, SLn+1). The solution may further find/identify, the median of both the security levels and assign median security level to the communication link (e.g., Li SL=median [Device1 SL, Device2 SL]). In some embodiments, the solution may calculate the security levels for all communication links in the network. It is noted that the proposed solution may include an opt-in feature that a user may agree to in order to allow the solution to analyze the content/data, devices, and/or communication link(s).

In some embodiments, the proposed solution may include a rank function, which is used to determine the security level for content based on content sensitivity, the rank function being:

$$R(Li) = \frac{\sum_{i=1}^{n} V(p) * W(p)}{n}$$

Where,
Li, is the IoT device for which risk rank is to be calculated;
p, is the parameter to calculate the rank;
V, is the value of the parameter;
W, is the weight that dictates which parameter is important to calculate the risk rank; and
n, is the total number of parameters.

In some embodiments, parameters that decide what is sensitive in the data that IoT devices capture are: privacy data, personal data, tags from manufacturers (as discussed above), health data, location data, etc.

In some embodiments, the proposed solution may include a threshold function, which is used to determine if a security level should be dynamically increased, the threshold function being:

$$TI = \frac{\sum_{i=1}^{n} R(Li)}{n}$$

Where,
R(Li), is the security risk rank for the IoT device, D(i); and
n, is the total number of IoT devices.

If the IoT device is generating the PII/SPI data, the proposed solution assigns more weight to the device. Additionally, if the communicating device is accepting any PII/SPI data, the proposed solution assigns more weight to the communication link (Li).

Referring now to FIG. 1, illustrated is a block diagram of an example system 100 for optimum IoT device security, in accordance with aspects of the present disclosure.

As depicted, the system 100 includes a communication channel 102, content 104, a dynamic security adjuster 106, a source device analyzer 108, a target device analyzer 110, a content analyzer 112, a decision engine 114, a security level identifier 116, an encryption applicator 118, and a calibrated data bank 120.

In some embodiments, the content 104 is received by the system 100 through the communication channel 102, and the content 104 is identified from a communication (not depicted) in the communication channel 102. The system 100 then utilizes the dynamic security adjuster 106 to analyze the content 104. The dynamic security adjuster 106 processes the content 104 (or the communication) through each of the source device analyzer 108, target device analyzer 110, and content analyzer 112, which each rank or provide weight to the sensitive nature of the content 104.

The rank or weight of the sensitive nature of the content 104 is then sent from the source device analyzer 108, target device analyzer 110, and content analyzer 112 to the decision engine 114, which may compare the rank or weight with calibrated data in the calibrated data bank 120, where the calibrated data includes a predefined list of sensitivity levels/security levels associated with specific content.

In some embodiments, the decision engine 114 provides a decision on the sensitivity of the content 104 to the security level identifier 116, which may provide a security level associated with the sensitivity. The security level identifier 116 then provides the security level to the encryption applicator 118, which then applies an encryption algorithm (e.g. SHA-256, etc.) or scheme (push notifications, etc.) to a source device and/or target device (not depicted).

Figure 2:
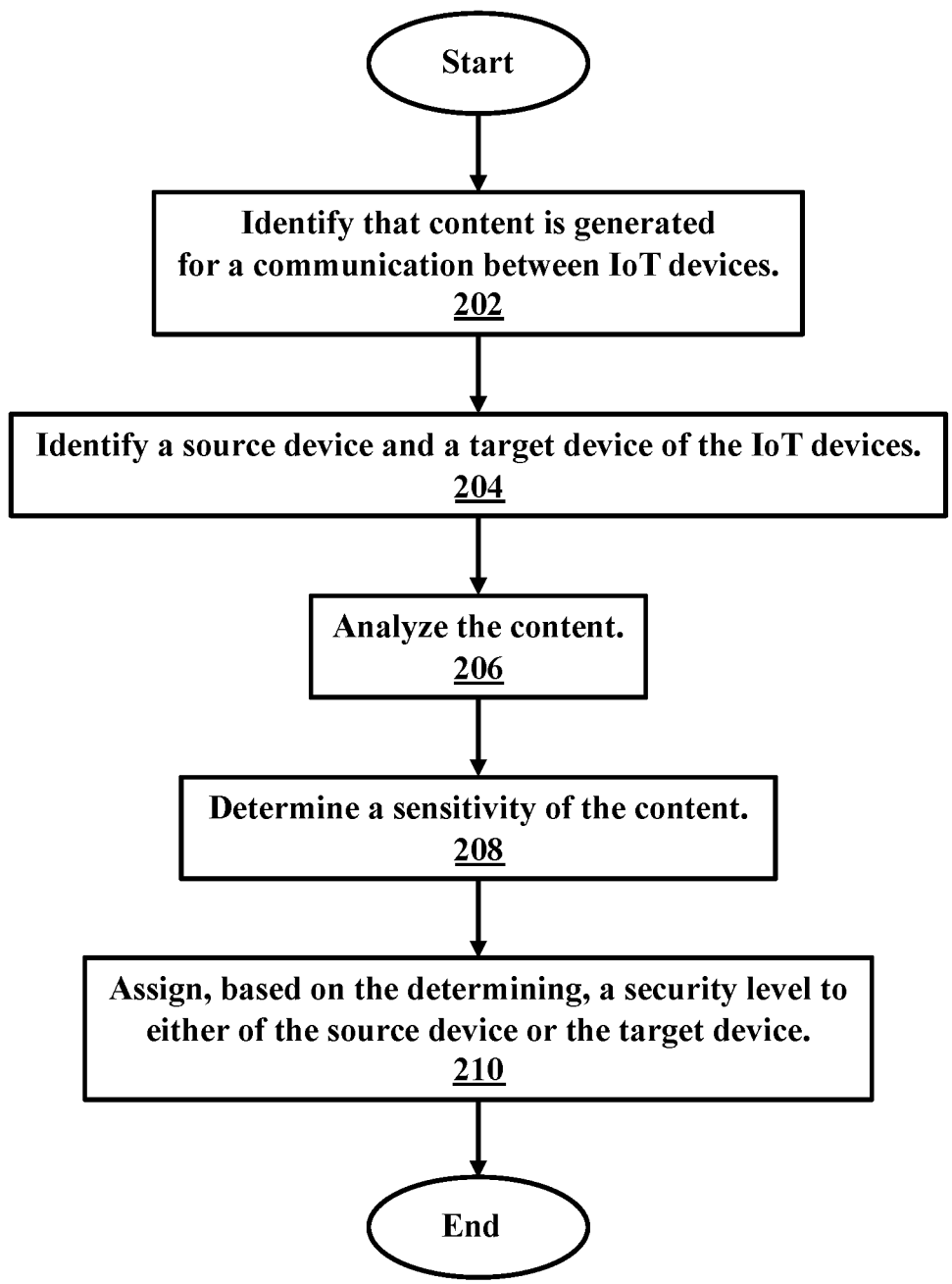
FIG. 2 illustrates a flowchart of an example method for optimum IoT device security, in accordance with aspects of the present disclosure.

Referring now to FIG. 2, illustrated is a flowchart of an example method 200 for optimum IoT device security, in accordance with aspects of the present disclosure. In some embodiments, the method 200 may be performed by a processor (e.g., of the system 100 of FIG. 1, etc.).

In some embodiments, the method 200 begins at operation 202 where the processor may identify that content is generated for a communication between IoT devices. It is noted that a communication may be a message between devices, and content may be the sentiment or context of the communication.

In some embodiments, the method 200 may proceed to operation 204, where the process may identify a source device and a target device of the IoT devices. In some embodiments, the method 200 may proceed to operation 206, where the processor may analyze the content.

In some embodiments, the method 200 may proceed to operation 208, where the processor may determine a sensitivity of the content. In some embodiments, the method 200 may proceed to operation 210, where the processor may assign, based on the determining, a security level to either of the source device or the target device. In some embodiments, after operation 210, the method 200 may end.

In some embodiments, discussed below, there are one or more operations of the method 200 not depicted for the sake of brevity and which are discussed throughout this disclosure. Accordingly, in some embodiments, determining the sensitivity of the content may include the processor analyzing a calibrated data bank, where the calibrated data bank may include prefilled data that indicates the sensitivity based on content type (e.g., personal data, location data, etc.).

In some embodiments, the calibrated data bank may further include an indication of the security level as associated with sensitivity (e.g., personal data=high security level, name of a device=lesser security level, etc.).

In some embodiments, assigning the security level to either of the source device or the target device may include the processor identifying a predefined security level for the source device. The processor may further identify a predefined security level for the target device and generate a median security level for the assigning. In some embodiments, the median security level may be a combination of the predefined security levels for the source device and the target device (or all devices within a communication link, or all devices within all communication links of a network).

In some embodiments, the processor may apply a communication encryption based on the assigned security level. In some embodiments, applying the communication encryption may include the processor identifying which type of device each of the source device and the target device are and augmenting the communication encryption based on the type (e.g., dynamically changing the security level or encryption based on manufacturer recommendation, etc.).

In some embodiments, the processor may further analyze, continuously, the content for a change in sensitivity, and automatically update the security level.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
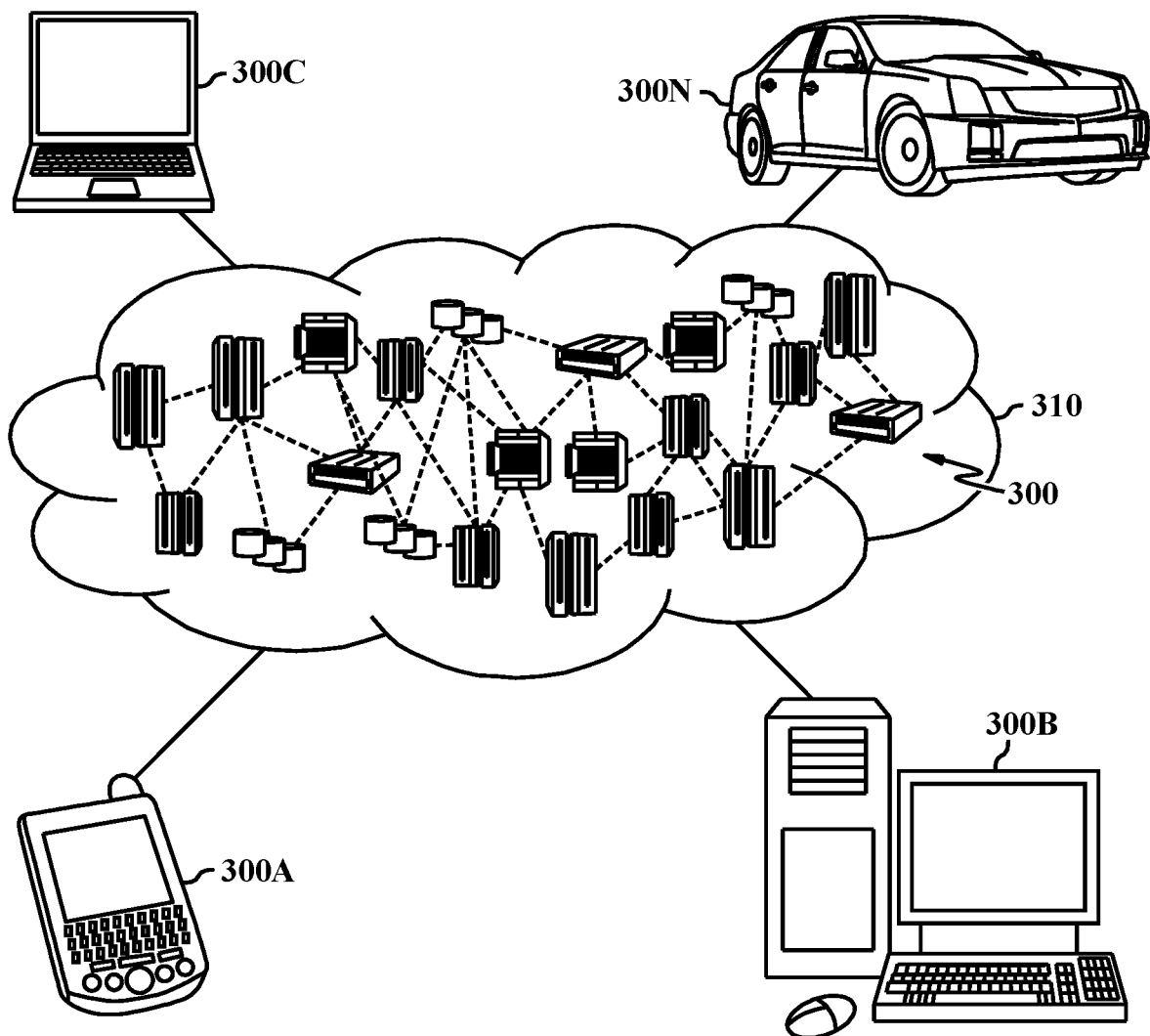
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
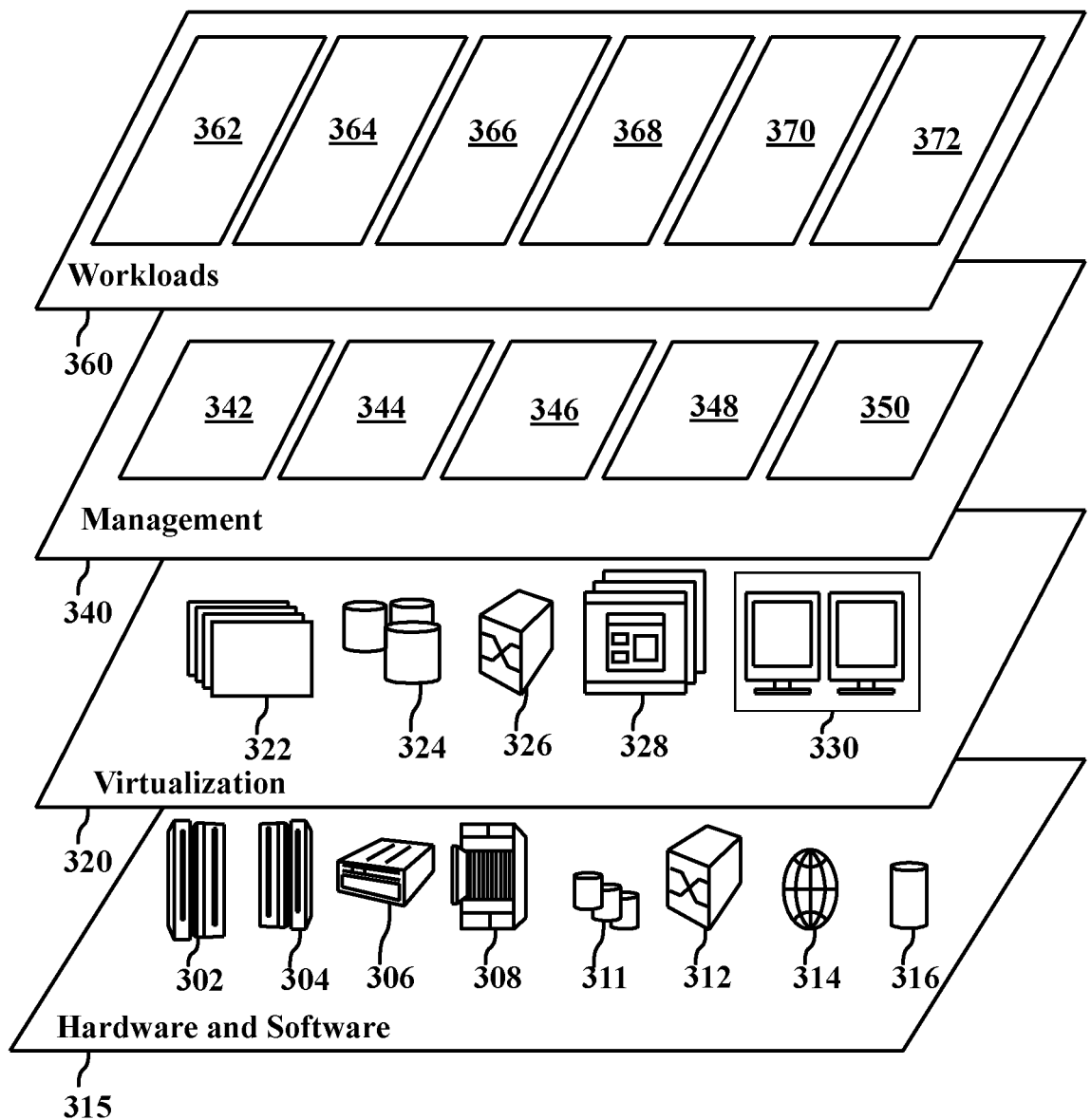
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and IoT device security optimization 372.

Figure 4:
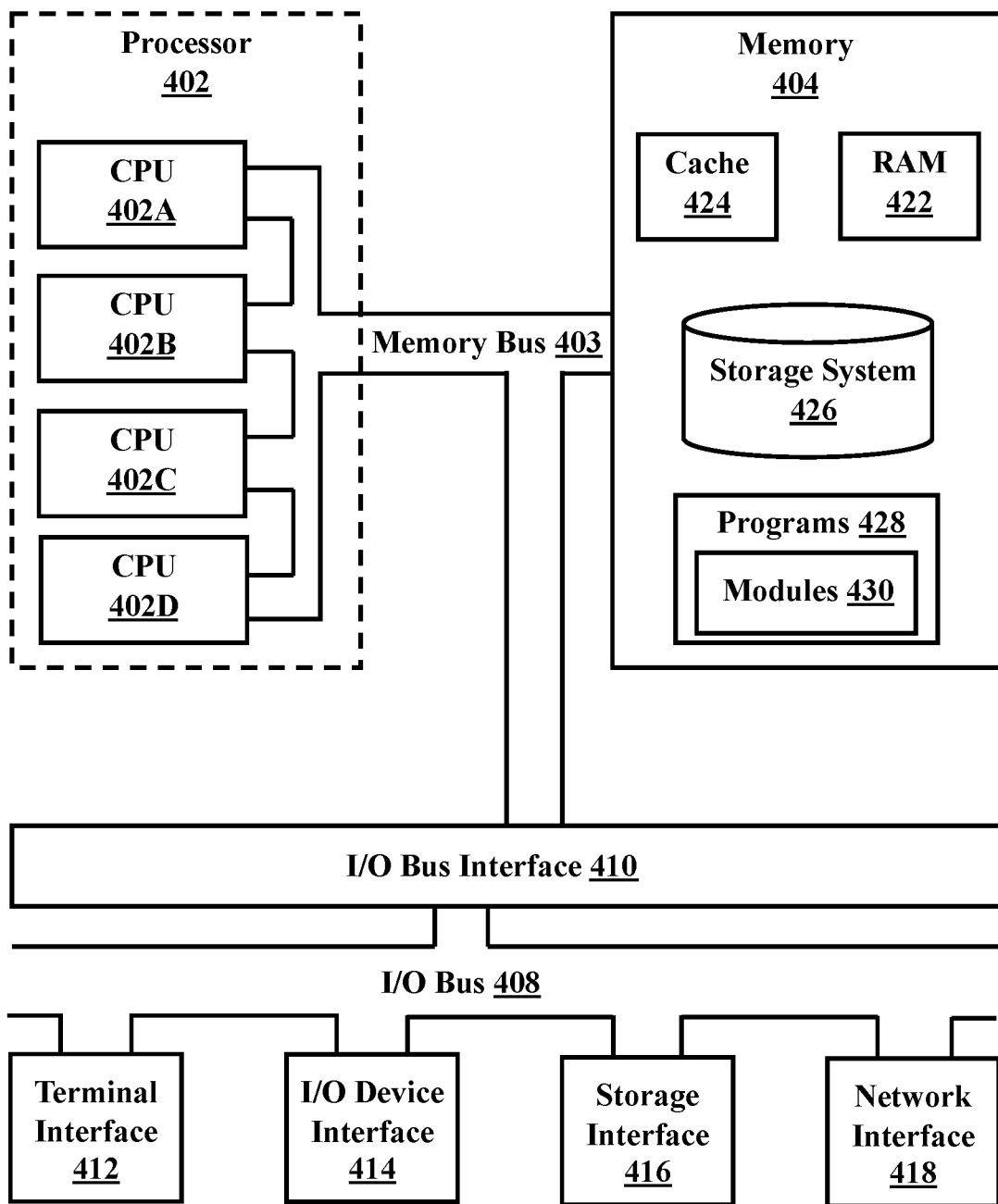
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for optimum internet-of-things (IoT) device security, the system comprising:
   a memory; and
   a processor in communication with the memory, the processor being configured to perform operations comprising:
   identifying that content is generated for a communication between IoT devices;
   identifying a source device and a target device of the IoT devices and identifying a type of device for both the source device and the target device;
   analyzing the content;
   determining a sensitivity of the content;
   assigning, based on the determining, a security level to either of the source device or the target device, wherein the security level for the source device is weighted if the source device is generating personal identifiable information (PPI) or sensitive personal information (SPI) data, and wherein a communication link is weighted if the target device is accepting PPI or SPI data; and
   applying a communication encryption based on the assigned security level, wherein the communication is augmented based on the type of device.

2. The system of claim 1, wherein determining the sensitivity of the content includes:
   analyzing a calibrated data bank, wherein the calibrated data bank includes prefilled data that indicates the sensitivity of the content based on content type and an indication of the security level associated with the content for which the sensitivity is determined.

3. The system of claim 1, wherein assigning the security level to either of the source device or the target device includes:
   identifying a predefined security level for the source device;
   identifying a predefined security level for the target device; and
   generating a median security level for the assigning, wherein the median security level is a combination of the predefined security levels for the source device and the target device.

4. The system of claim 1, wherein the processor is further configured to perform operations comprising:
   analyzing, continuously, the content for a change in sensitivity; and
   automatically updating the security level.

5. The system of claim 1, wherein the security level is determined based on the ability of either the source device or the target device to impact an overall system by controlling other IoT devices of the overall system and a geographic location of the source device and target device.

6. The system of claim 1, wherein assigning the security level further comprises:
   determining the security level for the source device, the target device, and one or more other IoT devices in a network;
   ranking at least the source device, the target device, and the one or more other IoT devices in the network based on the determined security level; and
   determining a communication security level for the communication link between each of the source device, the target device, and the one or more other IoT devices in the network.

7. The system of claim 6, wherein determining the communication security level for the communication link includes retrieving the security level for all the IoT devices involved in a communication, and wherein the communication security level for the communication link is dynamically increased according to a threshold function.

8. The system of claim 1, wherein the sensitivity of the content is determined according to a plurality of parameters, wherein at least one of the plurality of parameters are sensitivity tags assigned by a manufacturer.

9. A computer-implemented method for optimum internet-of-things (IoT) device security, the method comprising:
   identifying that content is generated for a communication between IoT devices;
   identifying a source device and a target device of the IoT devices and identifying a type of device for both the source device and the target device;
   analyzing the content;
   determining a sensitivity of the content;
   assigning, based on the determining, a security level to either of the source device or the target device, wherein the security level for the source device is weighted if the source device is generating personal identifiable information (PPI) or sensitive personal information (SPI) data, and wherein a communication link is weighted if the target device is accepting PPI or SPI data; and
   applying a communication encryption based on the assigned security level, wherein the communication is augmented based on the type of device.

10. The computer-implemented method of claim 9, wherein determining the sensitivity of the content includes:
    analyzing a calibrated data bank, wherein the calibrated data bank includes prefilled data that indicates the sensitivity of the content based on content type and an indication of the security level associated with the content for which the sensitivity is determined.

11. The computer-implemented method of claim 9, wherein assigning the security level to either of the source device or the target device includes:
    identifying a predefined security level for the source device;
    identifying a predefined security level for the target device; and
    generating a median security level for the assigning, wherein the median security level is a combination of the predefined security levels for the source device and the target device.

12. The computer-implemented method of claim 9, further comprising:
    analyzing, continuously, the content for a change in sensitivity; and
    automatically updating the security level.

13. The computer-implemented method of claim 9, wherein assigning the security level further comprises:
    determining the security level for the source device, the target device, and one or more other IoT devices in a network;
    ranking at least the source device, the target device, and the one or more other IoT devices in the network based on the determined security level; and
    determining a communication security level for the communication link between each of the source device, the target device, and the one or more other IoT devices in the network.

14. The computer-implemented method of claim 13, wherein determining the communication security level for the communication link includes retrieving the security level for all the IoT devices involved in a communication, and wherein the communication security level for the communication link is dynamically increased according to a threshold function.

15. A computer program product for optimum internet-of-things (IoT) device security comprising a computer readable storage medium having program instructions embodied therewith, the program instructions executable by a processor to cause the processor to perform operations, the operations comprising:
    identifying that content is generated for a communication between IoT devices;
    identifying a source device and a target device of the IoT devices and identifying a type of device for both the source device and the target device;
    analyzing the content;
    determining a sensitivity of the content;
    assigning, based on the determining, a security level to either of the source device or the target device, wherein the security level for the source device is weighted if the source device is generating personal identifiable information (PPI) or sensitive personal information (SPI) data, and wherein a communication link is weighted if the target device is accepting PPI or SPI data; and
    applying a communication encryption based on the assigned security level, wherein the communication is augmented based on the type of device.

16. The computer program product of claim 15, wherein determining the sensitivity of the content includes:
    analyzing a calibrated data bank, wherein the calibrated data bank includes prefilled data that indicates the sensitivity of the content based on content type and an indication of the security level associated with the content for which the sensitivity is determined.

17. The computer program product of claim 15, wherein assigning the security level to either of the source device or the target device includes:
    identifying a predefined security level for the source device;
    identifying a predefined security level for the target device; and
    generating a median security level for the assigning, wherein the median security level is a combination of the predefined security levels for the source device and the target device.

18. The computer program product of claim 15, wherein assigning the security level further comprises:

determining the security level for the source device, the target device, and one or more other IoT devices in a network;
ranking at least the source device, the target device, and the one or more other IoT devices in the network based on the determined security level; and
determining a communication security level for the communication link between each of the source device, the target device, and the one or more other IoT devices in the network.

19. The computer program product of claim 18, wherein determining the communication security level for the communication link includes retrieving the security level for all the IoT devices involved in a communication, and wherein the communication security level for the communication link is dynamically increased according to a threshold function.

\* \* \* \* \*